US012589566B2

(12) United States Patent
Lamgaday et al.

(10) Patent No.: US 12,589,566 B2
(45) Date of Patent: Mar. 31, 2026

(54) AIR BARRIER FILM TUBING TO REPLACE INNER-LINER (BUTYL)

(71) Applicant: The Goodyear Tire & Rubber Company, Akron, OH (US)

(72) Inventors: Robin Lamgaday, Copley, OH (US); Adam Mark Baldan, Akron, OH (US); Benjamin Isaiah Garn, Norton, OH (US); Carl Trevor Ross Pulford, Akron, OH (US); Dinesh Chandra, Akron, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 18/423,368

(22) Filed: Jan. 26, 2024

(65) Prior Publication Data

US 2024/0262064 A1 Aug. 8, 2024

Related U.S. Application Data

(60) Provisional application No. 63/483,400, filed on Feb. 6, 2023.

(51) Int. Cl.
B29D 30/06 (2006.01)
(52) U.S. Cl.
CPC .. B29D 30/0681 (2013.01); *B29D 2030/0682* (2013.01)
(58) Field of Classification Search
CPC ............ B29D 30/0681; B29D 30/0685; B29D 2030/0682; B29D 2030/0686; B29D 2030/069; B29D 2030/0691; B29D 2030/0694; B29D 2030/0698

USPC ........................................................ 425/28.1
See application file for complete search history.

(56) References Cited

U.S. PATENT DOCUMENTS 4,595,448 A 6/1986 Sorioka
2017/0190129 A1* 7/2017 Seto ....................... B29D 30/42

FOREIGN PATENT DOCUMENTS

CZ 339999 A3 * 6/2000
JP 2014043078 A 3/2014
WO 2009001722 A1 12/2008

OTHER PUBLICATIONS

Vannan Frederic Forbes Jr, CZ-339999-A3, machine translation. (Year: 2000).*
European Search Report for Serial No. EP24155629 mailed Jul. 17, 2024.

* cited by examiner

*Primary Examiner* — Sedef E Paquette
(74) *Attorney, Agent, or Firm* — Eryn Ace Fuhrer; June E. Rickey

(57) ABSTRACT

In one aspect, the invention is directed to a method of providing an air barrier layer to a tire comprising at least the following steps: providing a tire comprising a tire cavity and an inner surface facing the tire cavity, providing a tubular film with at least one open end, and molding at least a portion of the tubular film to form an air barrier layer adapted to the inner surface of the tire. In another aspect, a cured tire is provided which comprises a tire cavity and an inner surface facing the tire cavity, and a tubular film of molten polymer is extruded. Said film is inserted into the tire cavity of the cured tire and expanded in the tire cavity to form an air barrier layer adapted to an inner surface of the tire.

11 Claims, 4 Drawing Sheets

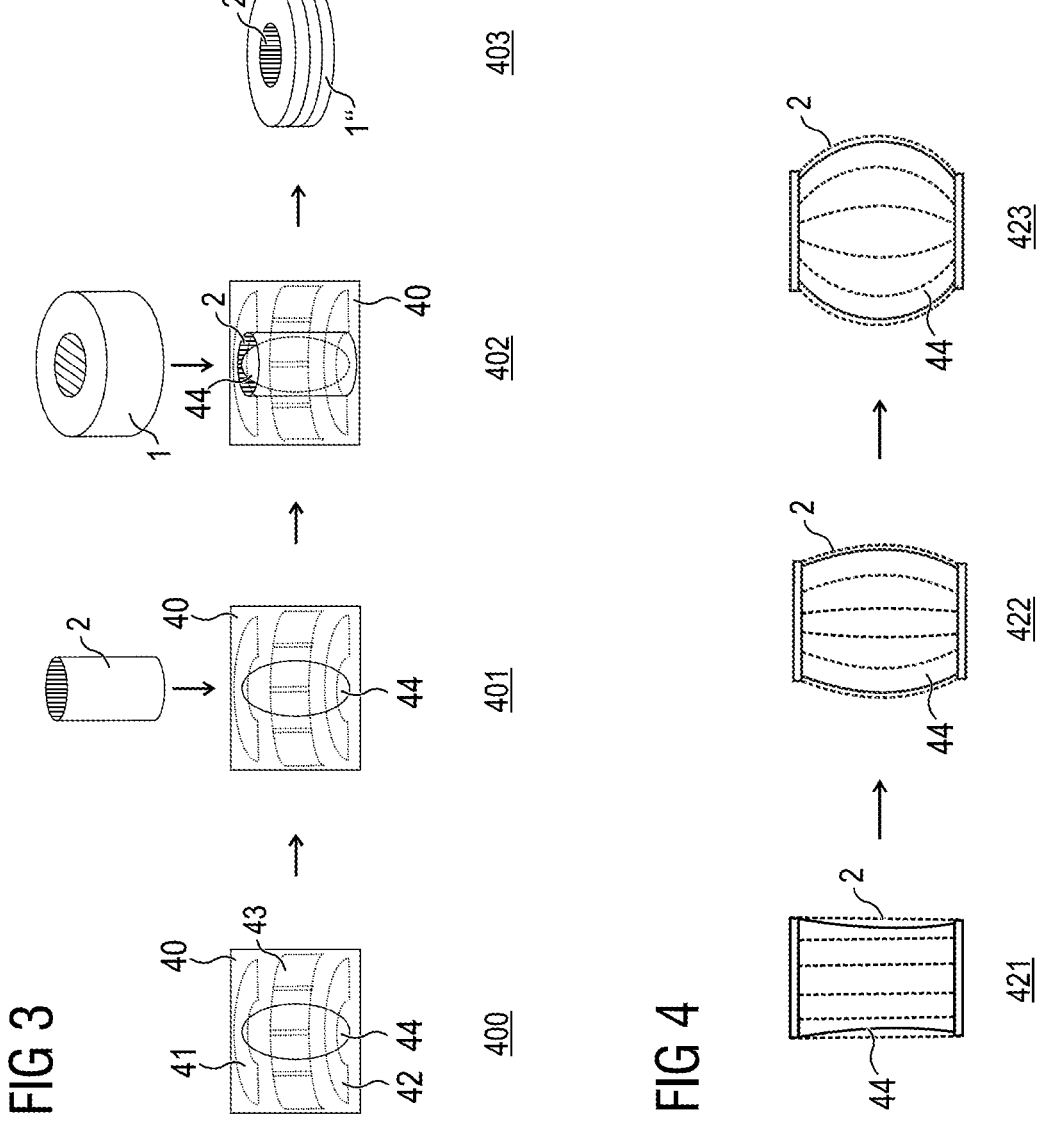

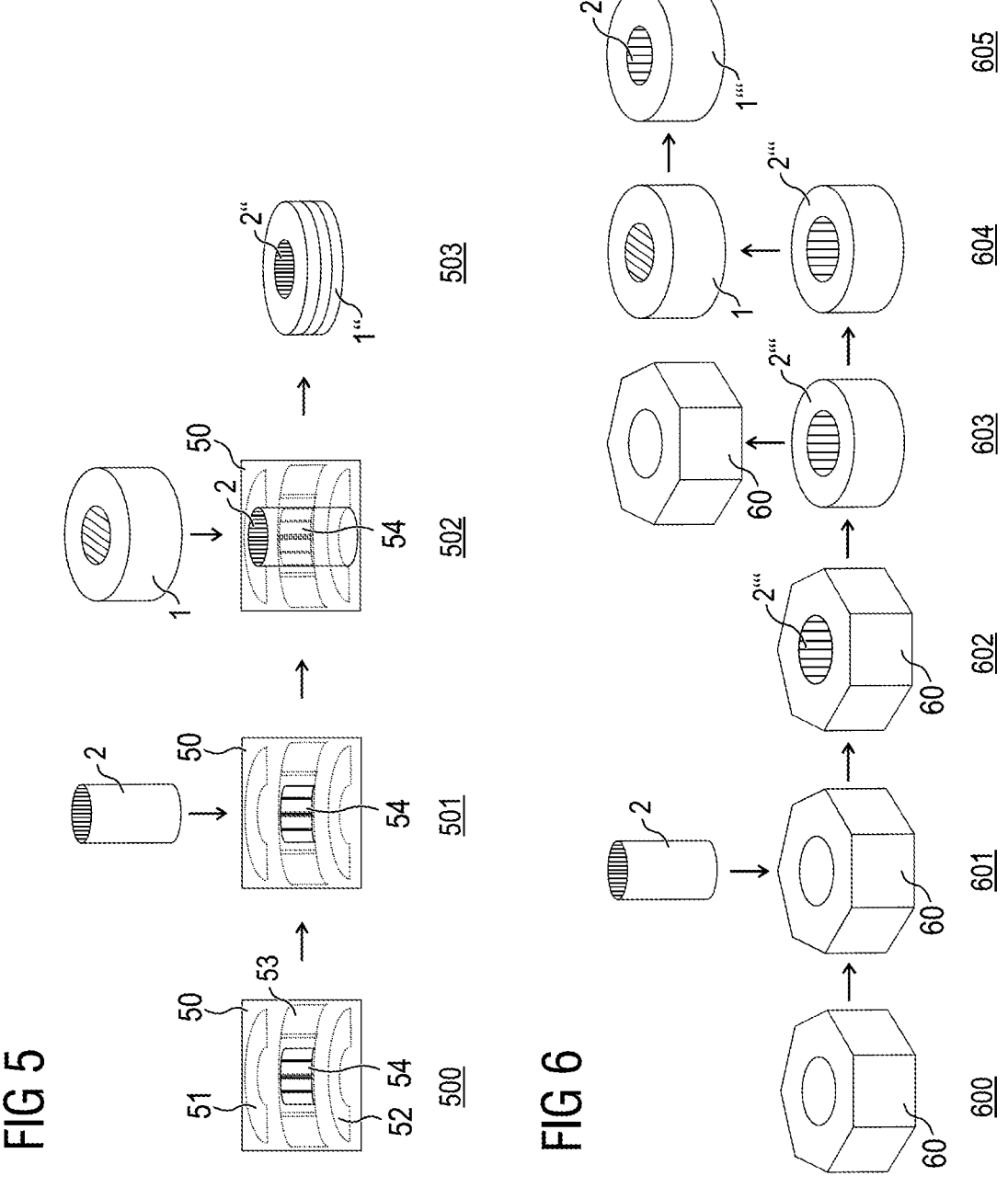

AIR BARRIER FILM TUBING TO REPLACE INNER-LINER (BUTYL)

FIELD OF THE INVENTION

The present invention is directed to a method of making a tire, and particularly to a method of providing an air barrier layer to a tire. The invention is also directed to a tire made with such a method.

BACKGROUND OF THE INVENTION

Pneumatic tires usually comprise an airtight innerliner made from an elastomer composition, typically comprising butyl rubber. To replace such an innerliner, e.g., not comprising butyl rubber or by an innerliner having less weight, it has been suggested to provide air barrier films. Similar to butyl based innerliners such films have been suggested to be provided as a sheet for instance applied to a tire building drum, before application of a tire carcass and further tire components, including, e.g., beads, sidewalls and a tread. One disadvantage of such methods consists in that the film provided as a sheet to the tire building drum has a splice which may form non-uniformities in the cured tire or may not always be closed appropriately in the cured tire.

While various methods of providing air barrier films have been suggested in the art, significant room for improvement remains.

SUMMARY OF THE INVENTION

In a first aspect, the present invention is directed to a method of providing an air barrier layer to a tire comprising at least the steps of providing a tire comprising a tire cavity and an inner surface facing the tire cavity, and providing a tubular film with at least one open end. Furthermore, the method comprises the step of molding the tubular film to form an air barrier layer adapted to the inner surface of the tire.

In a second aspect, the present invention is directed to another method of providing an air barrier layer to a tire comprising at least the steps of providing a tire comprising a tire cavity and an inner surface facing the tire cavity, and providing a tubular film with two open ends. Furthermore, this method comprises the step of applying the tubular film onto an expandable curing bladder of a tire curing press. In a further step, the curing bladder is expanded so as to expand the film, which is applied onto the curing bladder, in the tire cavity to form the air barrier layer adapted to the inner surface of the tire.

In a third aspect, the present invention is directed to a method of providing an air barrier layer to a tire comprising at least the steps of providing a cured tire comprising a tire cavity and an inner surface facing the tire cavity, and extruding a tubular film of molten polymer. Furthermore, in this aspect, the method comprises the step of inserting the tubular film of molten polymer into the tire cavity of the cured tire, and expanding the tubular film in the tire cavity of the cured tire to form the air barrier layer adapted to the inner surface of the tire.

BRIEF DESCRIPTION OF THE DRAWINGS

The invention will be described by way of example and with reference to the accompanying drawings in which:

FIG. 3 schematically shows the steps of a third embodiment of a method of providing an air barrier layer to a tire, particularly to an uncured tire in a tire curing press having a curing bladder;

FIG. 4 schematically shows the expansion of a tubular film by a curing bladder;

FIG. 5 schematically shows the steps of a fourth embodiment of a method of providing an air barrier layer to a tire, in particular to an uncured tire in a tire curing press, such as a curing mold press, having expandable mold segments;

FIG. 6 schematically shows the steps of a fifth embodiment of a method of providing an air barrier layer to a tire, in particular to an uncured tire, wherein a tubular film is pre-molded in a film mold so as to form a pre-molded film inserted later into an uncured tire.

DETAILED DESCRIPTION OF THE INVENTION

Figures 1, 2:
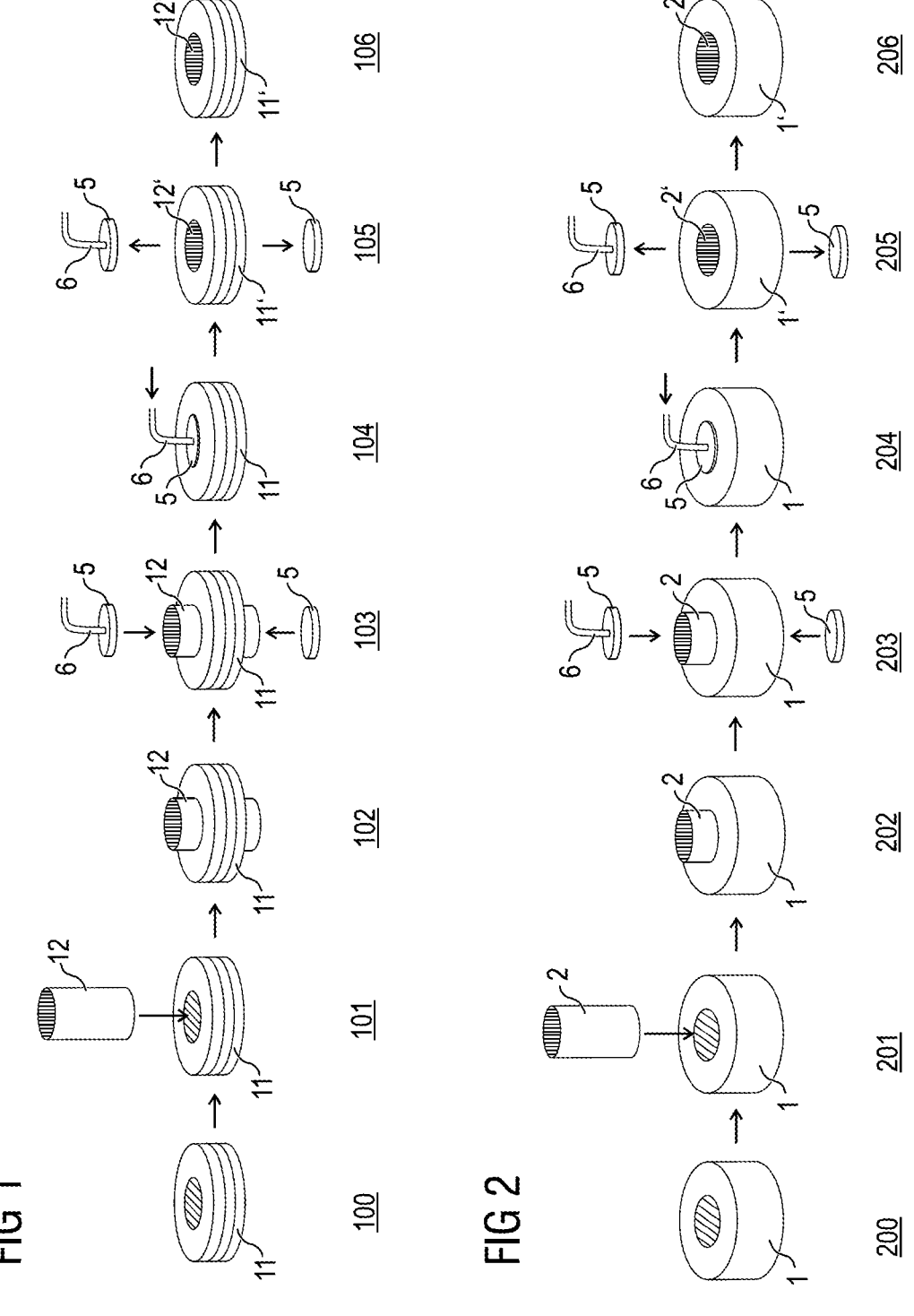
FIG. 1 schematically shows the steps of a first embodiment of a method of providing an air barrier layer to a tire, particularly to a cured tire.
FIG. 2 schematically shows the steps of a second embodiment of a method of providing an air barrier layer to a tire, particularly to an uncured tire.

According to the first aspect, a method of providing an air barrier layer (or film) to a tire comprises at least the steps of: providing a tire comprising a tire cavity and an inner surface facing the tire cavity, and providing a tubular (shaped) film with at least one open end (such as two open ends). Furthermore, the method comprises the step of molding (at least a portion of) the tubular film to form an air barrier layer (or film) adapted to the inner surface of the tire.

In such a process, a tire is provided, e.g., a cured tire or an uncured tire (sometimes also referred to as a green tire), and the tubular film is applied to this already existing or built tire. Thus, it is possible to leave the tire building process largely unaffected. Preferably, the provided tire does not comprise a tire innerliner, e.g., an innerliner comprising an elastomer composition, particularly an elastomer comprising butyl rubber. Provision of the tubular film during tire assembly on a tire building drum is not necessary. The air barrier layer or film can be provided without a splice. Tire curing cycle time can be reduced because a typical butyl rubber innerliner can be omitted.

In one embodiment, the method comprises one or more of the following steps: inserting the tubular film at least partially into the tire cavity (e.g., along an axial direction of the tire); and expanding the tubular film in the tire cavity to form the air barrier layer adapted to the inner surface of the tire. In particular, the step of molding (at least a portion of) the tubular film to form an air barrier layer (or film) adapted to the inner surface of the tire may comprise or consist of the step of expanding the tubular film in the tire cavity to form the air barrier layer adapted to the inner surface of the tire.

In another embodiment, one or two (open) ends of the film are shortened (e.g., by cutting) before and/or after expanding the tubular film in the tire cavity to form the air barrier layer adapted to the inner surface of the tire. For instance, the tubular film may have two open ends, or it may have only one open end, e.g., if inserted directly by blow molding into the tire.

In yet another embodiment, the tubular film is expanded by one of: an expandable curing bladder, preferably in a curing press; one or more expandable mold segments, preferably in a curing press; and a pressured fluid fed or blown into the tubular film. In case of the pressured fluid being fed directly into the tubular film, the fluid could be steam or gas, preferably steam having a temperature within a range of 50° ° C. to 200° ° C., preferably 65° C. to 190° C., or even more preferably 150° to 180° C. Preferably, the upper limit of such a temperature range is the melting point of the film material, or at least 1° C. below the melting point of the film, preferably at least 5° C. below the melting point of the film. The curing press can also be described as tire curing press herein. A melting point of the film, or film material, is determined according to ASTM D3418-21, or equivalent. Relatively high film and/or tire temperatures help to provide a relatively soft film material which helps to reduce non-uniformities of the applied film. In an example of blow molding, the film may behave similar to a high viscosity melt which also helps to reduce non-uniformities. Anisotropies, such as in strength and/or modulus can be decreased.

In still another embodiment, the tubular film is expanded by the pressured fluid (preferably gas or steam) fed into the tubular film, wherein the at least one open end of the tubular film is sealed by sealing means (such as comprising a sealing plate) and the fluid (preferably the gas or steam) is fed or provided through an inlet in the sealing means into the tubular film positioned inside the tire cavity to expand the tubular film in the tire cavity to form the air barrier layer adapted to the inner surface of the tire. It is also possible that parts of the tubular film extend out of the tire cavity wherein the tubular film is sealed on both axial/lateral sides of the tire. One or more excess portions of the tubular film could be cut after the expansion of the tubular film in the tire cavity to from the air barrier layer adapted to the inner surface of the tire. Feeding the pressured fluid into the tubular film may also be described as blowing the pressured fluid into the volume enclosed by the tubular wall of the tubular film.

In another embodiment, the film is blow molded to form the air barrier layer adapted to the inner surface of the tire (preferably, including expanding the film by pressured gas).

In another embodiment, the tubular film is blow molded to form the air barrier layer adapted to the inner surface of the tire, including extruding the tubular film as a tubular parison. As another option, the tubular film is (e.g., directly) provided to a post-cure inflation (sometimes referred to as PCI) stage in the form of the tubular parison, and is inserted into and/or expanded in the tire. For instance, this allows to provide the film still hot from extrusion (in the form of the tubular parison) and expand it in the warm tire.

In still another embodiment, the tubular film is expanded in the tire cavity at a post-cure inflation stage.

In still another embodiment, the sealing means are removed after forming the air barrier layer adapted to the inner surface of the tire.

In still another embodiment, one or more excess end portions of the tubular film are cut after forming the air barrier layer adapted to the inner surface of the tire, optionally after having removed scaling means.

In still another embodiment, the step of providing a tire provides a cured tire, so that the tubular film is expanded in the tire cavity of the cured tire to form the air barrier layer adapted to the inner surface of the cured tire. Preferably, said cured tire is devoid of an innerliner, e.g., an innerliner comprising butyl rubber.

In still another embodiment, the tubular film (e.g., as a parison) is inserted into the tire cavity along an axial direction of the tire, preferably such that one open end of the film is positioned on one axial/lateral side of the tire and a second open end of the film (if present) is positioned on an opposite axial/lateral side of the tire. Optionally, essentially one half of the tubular film is on one side of an equatorial plane of the tire and a second half of the tubular film is on another side of the tire. Preferably, the tubular film has an essentially hollow cylindrical shape before its application to the tire. In particular, the tubular film is not a closed ring or torus.

In still another embodiment, the step of providing a tire provides an uncured tire, wherein the uncured tire is cured upon or after forming the air barrier layer adapted to and/or on the inner surface of the tire, so as to obtain a cured tire with the air barrier layer on the inner surface of the cured tire.

In still another embodiment, the step of providing a tire provides an uncured tire, wherein the tubular film is expanded by one of i) an expandable curing bladder, preferably in a (tire) curing press, and ii) one or more expandable mold segments, preferably in a (tire) curing press. Optionally, the tubular film is applied onto or over one of the expandable curing bladder, and the one or more expandable mold segments in said curing press. In addition, or alternatively, the curing bladder and/or the one or more expandable mold segments expand the tubular film in the tire cavity to form the air barrier layer adapted to the inner surface of the tire. Optionally, the uncured tire is cured in the curing press to obtain a cured tire having the air barrier layer formed on its inner surface. The use of an expandable curing bladder, or in other words bladder, particularly of a (tire) curing press is a most preferred option herein. In particular, such a method can be of advantage for applying the film with reduced stress. Moreover, such an application of the tubular film allows the use of relatively high pressures, such as within a range of 10 psi to 500 psi, preferably 20 psi to 400 psi, or even more preferably 100 psi to 250 psi, which is for instance far higher than the pressure used on tire building drums which are for instance more than about 10 times lower. Preferably, the tubular film is applied onto the bladder so as to surround the bladder and/or such that the bladder is located (at least partially) within the tubular inner space of the film.

In a preferred embodiment, the whole inner surface of the tire is covered by the air barrier layer and/or film. Thus, for instance, the film is expanded to form the air barrier layer adapted to the whole inner surface of the tire.

In still another embodiment, the tubular film comprises at least two layers, wherein a tubular inner layer of the layers comprises a thermoplastic polymer and/or resin, and a tubular outer layer of the layers comprises an elastomer, or in other words rubber, composition (e.g., comprising natural rubber and/or synthetic polyisoprene, but which is preferably free of butyl rubber), wherein the tubular outer layer faces the inner surface of the tire. The tubular outer layer can be an elastomer composition which is sulfur vulcanizable in a (tire) curing press. Optionally, it comprises sulfur and preferably one or more of accelerator, filler (such as carbon black and/or silica), resin, processing aids, oil, and antidegradant. In another embodiment, the outer layer is an RFL adhesive.

In still another embodiment, the method comprises one or more of the following steps: (pre-)molding or shaping the tubular film separately from the tire to obtain a pre-molded film adapted to (the shape of) the inner surface of the tire; inserting the pre-molded film into the tire cavity; attaching the pre-molded film to the inner surface of the tire to form the air barrier layer adapted to the inner surface of the tire. This is another process which allows to leave the tire building process relatively unchanged.

In another embodiment, the step of molding (at least a portion of) the tubular film to form an air barrier layer (or film) adapted to the inner surface of the tire comprises or consists of (pre-)molding or shaping the tubular film separately from the tire to obtain a pre-molded film adapted to (the shape of) the inner surface of the tire. As an option, (pre-)molding or shaping the tubular film separately from the tire is carried out by blow molding. In such an example, the tubular film can be provided as a tubular parison, which is (pre-)molded or shaped to obtain the pre-molded film adapted to the shape of the inner surface of the tire.

In still another embodiment, the step of providing a tire provides an uncured tire, wherein the step of molding the tubular film includes molding the tubular film separately from the uncured tire to obtain a pre-molded film adapted to the shape of the inner surface of the uncured tire. Preferably, the pre-molded film is inserted into the tire cavity of the (already existing) uncured tire. Then the tire may be cured to obtain a cured tire including the air barrier layer adapted to the inner surface of the tire.

In another embodiment, the step of providing a tire provides a cured tire, wherein the step of molding the tubular film includes molding the tubular film separately from the cured tire to obtain a pre-molded film adapted to the shape of the inner surface of the cured tire. Optionally, the pre-molded film is inserted into the tire cavity of the cured tire and/or attached to the inner surface of the tire to form the air barrier layer adapted to the inner surface of the cured tire.

In one embodiment the step of molding the tubular film, can include providing a (film) mold comprising one or more radially inner mold segments and one or more radially outer mold segments, wherein the tubular film is clamped between the radially inner mold segments and the radially outer mold segments so as to mold or form the film into a shape adapted to or corresponding to the shape of the inner surface of the tire. In principle, this process is suitable for uncured tires or for cured tires. However, typically the shape of the inner surface of an uncured tire will be different from the shape of the inner surface of the cured tire, e.g., when considering the same tire to be manufactured.

In another embodiment, the tubular film is pre-heated before expanding, preferably to a temperature up to its melting point, or preferably 1° C. below its melting point, or 5° C. below its melting point, or even more preferably to a temperature within a range of 40° ° C. to 70° C., or 50° ° C. to 70° C., which for instance simplifies film handling and/or application.

In another embodiment, the tubular film has a temperature up to its melting point, or preferably 1° C. below its melting point, or 5° C. below its melting point, or even more preferably it has a temperature within a range of 40° C. to 70° C., or 50° C. to 70° C., when starting to expand the tubular film.

In another embodiment, the tire, e.g., the cured tire or the uncured tire, has a temperature within a range of 50° ° C. to 175° C. (e.g., if it is cured), or 50° C. to 120° C. (e.g., if it is uncured), when the film is inserted into and/or expanded in the tire. It is also possible that the tire has room temperature (e.g., 23° C.) or other temperatures lower than those of the above ranges. However, elevated temperatures may support and/or ease film application.

In still another embodiment, the film is inserted in the tire within less than 30, preferably less than 20 minutes after the tire has been cured, e.g., in a tire curing press. Thus, the tire is still relatively warm which is beneficial for the application of the film. In addition, or alternatively, the film is inserted and/or expanded in the tire at a post-cure inflation (PCI) stage. In other words, at such a stage of tire manufacturing the tire is still relatively warm.

In still another embodiment, the film is inserted and/or expanded in the tire at a post-cure inflation (PCI) stage, and preferably blow molded, and wherein the film is cooled under an inflation pressure of the post cure inflation stage. In case of blow molding, it can optionally be carried out as mentioned herein above.

In still another embodiment, the tire, e.g., the cured tire or the uncured tire, is heated, or pre-heated, to one or more of the above temperatures.

In still another embodiment, at least two of: i) a tire curing press for curing the tire, ii) a machine for manufacturing the tubular film, and iii) a station for inserting the film into the tire, are at the same site, e.g., within the same building.

In another embodiment, the tire is one or more of a pneumatic tire; a radial tire; a a tire comprising one or more of a tread, a carcass, two bead portions and two sidewalls extending between the tread and the respective bead portion; a tire comprising a circumferential bead portion on each lateral side of the tire which defines a circular opening to the tire cavity; devoid of an innerliner comprising butyl rubber; and devoid of butyl rubber.

In another embodiment, the tire is one or more of a passenger car tire and a truck tire.

In another embodiment, the tubular film is based on/comprising a thermoplastic polymer and/or resin, preferably one or more of ethylene vinyl alcohol copolymer (wherein preferably an ethylene copolymer ratio ranges from about 25 mole percent to about 50 mole percent), and a composition comprising a thermoplastic polyamide-based polymer, preferably a composition comprising 40 to 85 weight percent of a thermoplastic polyamide-based polymer comprised of a copolymer of a diamine and dicarboxylic acid, and from 15 to 60 weight percent of a dispersion comprising at least one of: (a) copolymer or mixture comprised of a polyamide-based segment and a polyether-based segment, and (b) polymer comprised of at least one of polyalkylene glycol (e.g. at least one of polyethyleneglycol, polypropyleneglycol and polytetramethylene glycol), polyoxyalkylene diamine (e.g. at least one of polyoxyethylene diamine, polyoxypropylene diamine and polyoxytetramethylene diamine) and copolymers thereof. For instance, the copolymer of diamine and dicarboxylic acid is comprised of at least one of nylon 6, nylon 6-6, nylon 4,6, nylon 11, nylon 12, nylon 6,10 and nylon 6,12. Preferably, it is comprised of at least one of polycaprolactam (nylon 6) and a copolymer of hexamethylenediamine and adipic acid (nylon 6-6), and/or wherein said thermoplastic polymer contains a dispersion of a copolymer comprised of a polyamide segment and a polyether-based segment.

In still another embodiment, the tubular film is one or more of:
  devoid of a splice;
  provided (and preferably cut) from a coil carrying the
    tubular film;
  essentially rotation-symmetric and/or can be brought into
    a hollow cylindrical shape;
  a film having an air permeability lower than 100 cm$^3$/
    (m$^2$·day), preferably 50 cm$^3$/(m$^2$·day), and/or option-
    ally higher than 1 cm$^3$/(m$^2$·day), determined for the tire
    comprising the air barrier layer under ASTM D1434, or
    equivalent;

a film having a thickness within a range of 0.1 mm to 1.5 mm, determined before expanding and/or pre-molding the tubular film.

In another embodiment, the film is based on/comprises an ethylene vinyl alcohol copolymer.

In non-limiting examples, ethylene vinyl alcohol copolymers are marketed under the trademarks EVAL® by EVAL Company of America (EVALCA), Lisle, Ill., SOARNOL® by Nippon Goshei Co., Ltd. (U.S.A.) of New York, N.Y., CLARENER by Solvay, and SELAR® OH by DuPont. In one embodiment, available copolymers of ethylene and vinyl alcohol. Those available from EVAL, will typically have an average ethylene content of between about 25 mol % to about 48 mol %.

In another embodiment, the tubular film has an elongation at break of at least 200%, preferably of at least 220%, determined for a dumbbell sample according to ASTM D412, or equivalent.

In another embodiment, the tubular film has an elastic modulus below 100 MPa, preferably below 90 MPa, determined according to ASTM D412, or equivalent.

In another embodiment, provided that the step of providing a tire provides an uncured tire, the method further comprises the step of curing the tire at a temperature within a range of 100° C. and 190° C., preferably 110° C. to 180° C. As an option, the upper limit of such a range is below the melting point of the film, preferably 1° C. below the melting point of the film, or 5° C. below the melting point of the film.

In still another embodiment, in which the step of providing a tire provides a cured tire, the inner surface of the tire has still a temperature within a range of 50° C. to 120° C., preferably from 80° C. to 100° C., from curing the tire, e.g., in a tire curing press (nevertheless it is an option that the tire has a lower temperature, such as below 80° ° C. or room temperature), when inserting the tubular film into the cured tire and expanding the tubular film in the tire cavity to form the air barrier layer adapted to the inner surface of the tire. In addition, or alternatively, the tubular film has a temperature within a range of 40° C. to 140° C., preferably from 40° C. to 120° C., or a temperature up to its melting point, or preferably 1° ° C. below its melting point, or 5° C. below its melting point, or a temperature within a range of 40° C. to 70° C., or 50° ° C. to 70° C., when inserting the tubular film into the cured tire and expanding the tubular film in the tire cavity to form the air barrier layer adapted to the inner surface of the tire.

In still another embodiment, an adhesive is provided between the film and the inner surface of the tire. For instance, such an adhesive can be selected from one or more of an RFL adhesive, a rubber-based adhesive, a silicone-based adhesive, and a urethane-based adhesive. Optionally, said RFL adhesive is comprised of a resorcinol-formaldehyde resin/styrene-butadiene-vinylpyridine latex optionally containing a styrene-butadiene rubber latex, and optionally containing a blocked isocyanate. Another option is a curing cement, such as used in retreading tires.

In still another embodiment, in which the step of providing a tire provides a cured tire, one or more of the tubular film and the inner surface of the tire are provided with an adhesive so as to bond or support bonding the tubular film to the inner surface of the cured tire.

According to the second aspect, the present invention is directed to a method of providing an air barrier layer to a tire comprising at least the steps of:

Providing a tire comprising a tire cavity and an inner surface facing the tire cavity;

Providing a tubular film with two open ends;

Applying the tubular film onto an expandable curing bladder of a tire curing press; and Expanding the curing bladder (e.g., by steam) so as to expand the film applied onto the curing bladder in the tire cavity to form the air barrier layer adapted to the inner surface of the tire.

In one embodiment, the step of providing a tire provides an uncured tire, and/or the method comprises the further step of curing the tire within a temperature range from 110° C. to a temperature which is i) at least 1° C. below the melting point of the film and/or ii) at most 190°, so as to co-cure the film to the inner surface of the tire.

In another embodiment, the tubular film comprises one or more of: a) an RFL adhesive such as on its surface applied to the inner surface of the tire; b) a thermoplastic polymer and/or resin; and/or c) an elastomer layer on its surface applied to the inner surface of the tire.

In still another embodiment, the tubular film comprises at least two (tubular) layers, wherein a tubular inner layer of the layers comprises a thermoplastic polymer and/or resin, and a tubular outer layer of the layers comprises an elastomer, or in other words rubber, composition (e.g., comprising natural rubber and/or synthetic polyisoprene, but which is preferably free of butyl rubber), wherein the tubular outer layer faces the inner surface of the tire. As already mentioned herein above, such a tubular outer layer may be an elastomer composition which is sulfur vulcanizable in a (tire) curing press. In another embodiment, the tubular outer layer comprises or consists of an RFL adhesive.

In another embodiment, a layer of RFL adhesive is provided between the tubular film and the inner surface of the tire, such as on the inner surface of the tire and/or on a surface of the film to be attached to the inner surface of the tire.

According to the third aspect, another method comprises at least the steps of providing a cured tire comprising a tire cavity and an inner surface facing the tire cavity, and extruding a tubular film of molten polymer, or in other words a tubular molten film. Furthermore, in this aspect, the method comprises the step of inserting the tubular film of molten polymer into the tire cavity of the cured tire, and expanding the tubular film in the tire cavity of the cured tire to form the air barrier layer adapted to the inner surface of the tire.

In one embodiment, the step of inserting the film is essentially carried out in the axial direction.

In another embodiment, the cured tire has a temperature within a range of 50° C. to 175° C. (e.g., if it is cured), or 50° C. to 120° C. (e.g., if it is uncured), when the tubular film of molten polymer is inserted into and/or expanded in the tire cavity. It is also possible that the tire has room temperature (e.g., 23° C.) or other temperatures lower than those of the above ranges. However, elevated temperatures may support and/or case film application.

In still another embodiment, the tubular film has at least one open end, such as one open end or two open ends. For instance, the tubular film of molten polymer is extruded and blow molded, wherein the tubular film of molten polymer is optionally inserted with one open end into the tire and blow molded. As an option, a gas may be fed into the tubular film during blow molding so as to expand or inflate the tubular film of molten polymer onto the inner surface of the tire.

In still another embodiment, the tubular film of molten polymer is inserted in the tire within less than 30 minutes, preferably less than 20 minutes after the tire has been cured, e.g., in a tire curing press. Thus, the tire is still relatively warm which is beneficial for the application of the film. In addition, or alternatively, the tubular film of molten polymer is inserted and/or expanded in the tire at a post-cure inflation (PCI) stage. In other words, at such a stage of tire manufacturing the tire is still relatively warm.

In still another embodiment, the tubular film of molten polymer is inserted and/or expanded in the tire at a post-cure inflation (PCI) stage. In addition, or alternatively, the tubular film of molten polymer is blow molded, and the film is optionally cooled under an inflation pressure of the post cure inflation stage. In case of blow molding, the latter can optionally be carried out as mentioned herein above.

While the film is mentioned herein to be molten, this does not mean that the film cannot maintain a tubular shape. Rather it can be considered to have a viscosity that keeps the tubular shape for some time. Such processes as such are in principle known to the person skilled in the art of blow molding polymers. The tubular film of molten polymer can be described as tubular polymer parison. The expanded or blown film has a very low anisotropy such as in strength and/or modulus. The curing time of the tire can be reduced as an innerliner is not necessary and the film is included in the tire after tire cure. Other advantages mentioned herein apply also to the present method.

In still another embodiment, the tubular film of molten polymer, or in other words molten tubular film, is expanded by a gas, or in other words, by pressurized gas. Optionally, the tire cavity is sealed by sealing means (e.g., sealing plates), and gas is fed or blown into the tubular film so as to expand the film towards the inner surface of the tire. Afterwards, said sealing means may be removed.

In still another embodiment, the molten polymer is one or more of a molten thermoplastic polymer and a molten thermoplastic resin.

In a fourth aspect of the present invention, the present invention is directed to a tire having an air barrier layer made with the method according to the above first aspect and optionally in accordance with one or more of its embodiments.

Embodiments and/or features of the aspects mentioned herein can be combined with one another.

FIG. 1 shows another embodiment of the present invention, such as of the first and/or third aspect. The method shown in FIG. 1 comprises a step 100 of providing a cured tire 11. Such a tire has preferably all tire components apart from an air barrier layer or innerliner. In particular, it is devoid of a butyl rubber comprising innerliner. In a second, schematically shown step 101, a tubular film 12 is inserted in an axial direction into the tire cavity of the tire 11, thereby providing a tire 11 comprising the tubular film 12 inserted in the tire 11. As shown in step 102, it is possible one or more end portions of the film 12 extend out of the tire 11, e.g., on each axial side of the tire 11. For instance, it is possible that the tubular film 12 is provided as a cut piece of tubular film material (such as cut from a coil carrying the tubular film material) or provided as a tubular parison, such as in the case of blow molding. In step 103, sealing means 5, e.g., sealing plates 5, are provided to each axial side of the tire 11, and the film 12, respectively. One of the sealing plates 5 comprises an inlet (not explicitly shown) to provide gas or steam into an inner space formed by the tubular film 12, e.g., provided through fluid transporting means such as a hose 6. Optionally, the tubular film 12 is pressed in an axial direction towards the tire cavity and/or circumferentially clamped between each sealing plate and a circumferential bead portion of the tire 11. In principle, machines suitable for carrying out such pressing and/or clamping steps are available.

With reference to step 104, once the sealing plates 5 are in place, gas or steam is fed or blown through the hose 6 into the film so as to expand the film 12 towards the inner surface of the tire 11.

In step 105, the sealing plates 5 are removed again.

As shown in steps 105 and 106, the tire comprises the air barrier layer or film 12' adapted to the inner surface of the tire indicated by reference sign 11' now.

In this process, it is preferred that the cured tire 11 and the film 12 have both an elevated temperature to improve bonding of the film 12 to the inner surface of the tire 11. Thus, in a preferred embodiment, the tire 11 is provided in step 100 shortly after curing the tire, e.g., within less than 30 minutes after being removed from the tire curing press. In addition, or alternatively, the tubular film 12 provided in step 101 has just been manufactured less than 30 minutes before its provision to the tires in step 101. Alternatively, in case it is not possible or desired to provide the tire 11 and/or the film 12 soon after manufacturing, one or both may preferably be pre-heated before step 101. Preferred tire temperatures are preferably up to 80° C. Preferred film temperatures are also up to 80° C. Optionally, it is possible to use an adhesive to improve bonding of the film 12 to the tire, e.g., one or more of rubber based adhesives, silicone based adhesives, and urethane based adhesives. Preferably, it is also possible that the gas or steam provided in step 104 is heated, such as within a temperature range of 65° C. to 190° C. As another option, it is possible to blow mold the tubular film 12, including extrusion of a tubular film parison (e.g., a molten tubular film parison) which is inserted in the tire 11 and may be expanded to form an air barrier layer on the inner surface of the tire 11, preferably at a post cure inflation stage. In such a process, potential non-uniformities and/or deformations can be further reduced. Anisotropies, such as in strength and modulus can be decreased as well. Utilization of the tubular film 12 also allows a reduced curing press time of the tire as the provided cured tire has less material.

FIG. 2 shows another embodiment of a method of applying an air barrier layer to a tire. In this case the tire 1 depicted in FIG. 2 is an uncured tire which is provided in step 200. In step 201, a tubular film 2 is at least partially inserted into the tire cavity of the tire 1 so as to provide a tire 1 with an inserted film 2 shown in step 202. Similar to step 103 of FIG. 1, scaling plates 5 are provided to both axial sides of the tire 1 in step 203. Such sealing means 5 may comprise fluid transporting means, such as a hose 6 for providing pressured fluid through an air inlet in the sealing plates 5 into the interior of the tubular film 2. Step 204 shows the process of pumping gas or steam through the hose 6 and the sealing plate 5 into the film within the tire cavity of tire 1. Thereby the film is expanded towards the inner side of the tire 1, facing the tire cavity. In accordance with step 205, the sealing plates 5 are removed (after reducing the steam pressure again). As shown in steps 205 and 206, the tire 1' comprises the air barrier layer or film 2' attached to the inner surface of the tire 1'. Afterwards, the tire 1' may be cured with a conventional tire curing press. In the present embodiment, it is preferred that the film 2 comprises two layers, i.e., a first inner layer comprising a thermoplastic polymer and/or resin, and an outer layer comprising an elastomer composition, or in other words rubber composition. Such a rubber composition can improve the bond of the film 2 to the inner side of the tire 1 upon curing the tire 1'. In addition, or alternatively, a layer of RFL adhesive can be provided to improve the bond of the film 2 to the inner side of the tire 1.

FIG. 3 shows another preferred embodiment of the present invention. In this embodiment, a tire curing press 40 is provided. Said curing press comprises a curing bladder 44 and a plurality of mold segments 41, 42, 43. In an example, segment 41 could be an upper mold ring segment 41, segment 42 could be a lower mold ring segment 42 and the segments 43 could be radially movable segments 43. It is emphasized that method step 400 shows the curing press 40, including its mold segments 41, 42, 43, as well as the curing bladder in a simplified and schematic shape herein. In step 401, a tubular film 2 is applied in an axial direction onto the bladder 44 so as to circumferentially cover the bladder 44. In step 402, an uncured tire is provided which is inserted in the (open) curing press 40 comprising the bladder 44 and the film 2 mounted onto the bladder 44. In a next step, not explicitly shown in FIG. 3, the curing press 40 is closed and the bladder 44 is expanded to apply the film 2 to the inner sidewall of the green or uncured tire 1. Such a step is schematically shown in FIG. 4. In particular, step 421 of FIG. 4 shows the tubular film 2 (e.g., a transparent tubular film) applied or mounted onto the curing bladder 44 which is not expanded yet in step 421. In a following step 422, steam and/or gas is blown into the bladder 44 to expand the bladder 44, which results also in an expansion of the film 2 covering the (outer) surface of the bladder 44. In a further step 423, the curing bladder 44 is even more expanded by the gas/and or steam so that the film 2 is also further expanded. Finally, such a further expansion of the bladder 44 pushes the film 2 onto the inner surface of the cured tire (not explicitly shown in FIG. 4). As a result, and as shown in step 403 of FIG. 3, the cured tire 1" comprises the air barrier layer 2" on its inner surface. Similar to the method of FIG. 2, the film 2 preferably comprises two layers. While in the embodiment shown in FIG. 3, the film 2 has been applied in a previous step to the bladder 44, it is also possible to mount or insert the tire 1 first into the mold and mount the film 2 afterwards onto the bladder 44. However, either way, the method uses an uncured tire, onto which the film 2 is applied in a tire cavity. In case portions of the film are left on one or more of the axial sides of the tire, those can be removed, such as cut, e.g., after step 402.

FIG. 5 shows another embodiment in accordance with the present invention, which is similar to the embodiment shown in FIG. 3, with the difference that movable (radially inner) mold segments are used. The press could also be described as a tire curing mold press. In a first step 500, the tire press 50 is provided which comprises a plurality of movable mold segments 51, 52, 53 and 54, which are at least partially movable from an open to a closed position to mold a tire. In step 501, a tubular film 2 is axially inserted into the curing press 50 by surrounding inner mold segments 54. In step 502, an uncured tire 1 is provided into the tire curing press 50 comprising amongst others the tubular film 2 mounted onto mold elements 54. Afterwards, and not explicitly shown herein, the mold 50 is closed, the film 2 is expanded to conform to the inner surface of the tire 1, and the tire 1 is cured. As a result of the curing process, the tire 1" comprising the air barrier layer or film 2" covering the inner surface of the cured tire 1" is obtained. In step 503, the film 2 may have properties similar to the film 2 utilized in the method shown in FIG. 3.

It is emphasized that the methods shown in FIGS. 3, 4 and 5 are schematically illustrated. Further mold elements or members may be used. For instance, as an option, one or more further clamping members and/or plates may be provided from an axial top position and/or an axial bottom position of the mold, such as for axially holding the bladder and/or the film in the mold.

FIG. 6 shows another method in accordance with the present invention. According to FIG. 6 a mold 60 is provided in method step 600. This mold 60 does not constitute a tire curing mold. Rather mold 60 provided in method step 600 is a mold comprising mold elements or segment for shaping a film into a shape essentially corresponding to the inner shape of a green tire 1 (e.g., as shown in step 604). In step 601, the film 2 is mounted into the mold 60. Then the film 2 is molded in the mold, preferably at least between radially inner mold segments and radially outer mold segments (not explicitly shown herein) so as to be adapted and/or form a film 2''' which fits or corresponds to the shape of the inner surface of an uncured tire 1. In step 602, the inner segments of the mold 60 have been removed and the film 2''' has been shaped to a shape corresponding to the inner surface of an uncured tire 1. Mounting and/or molding the film 2 preferably takes place at a temperature up to its melting point, or preferably 1° C. below its melting point, or 5° C. below its melting point. Preferably, said temperature is higher than 40° C., higher than 50° C. or higher than 70°, or even higher than 80° C.

Figure 7:
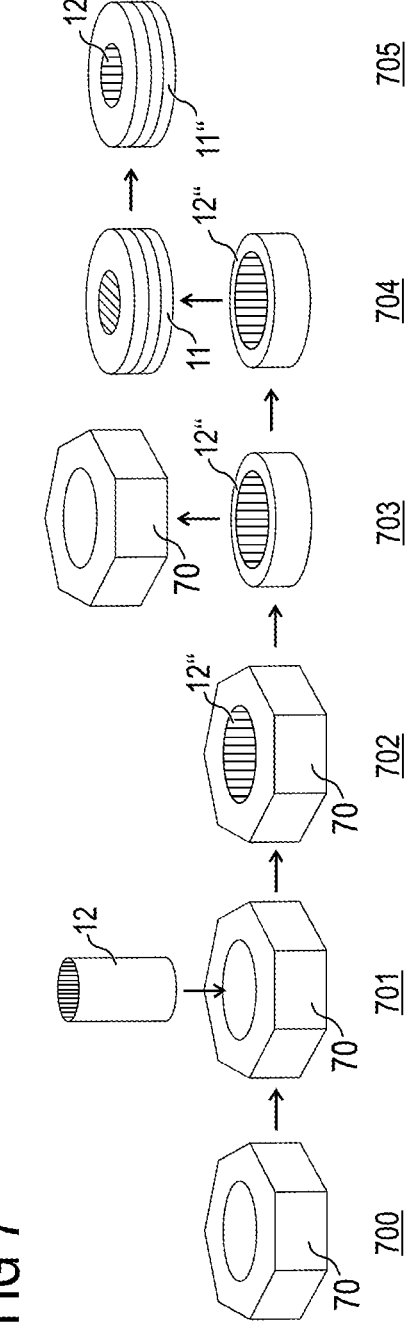
FIG. 7 schematically shows the steps of a sixth embodiment of a method of providing an air barrier layer to a tire, in particular to a cured tire, wherein a tubular film is pre-molded in a film mold so as to form a pre-molded film inserted later into a cured tire.

In step 603, outer parts of the mold 60 are removed leaving the film 2''' corresponding to the shape of the inner surface of the tire 1. In a further step 604, the film 2'''' is applied into a tire cavity of the tire 1 so as to cover its inner surface. In other words, the pre-molded film 2''' is inserted into the tire cavity and/or applied to its inner surface facing the tire cavity. In step 605, the uncured tire 1''' is obtained which comprises the air barrier layer or film 2'''. In a further step, not explicitly shown herein, the tire can be cured in a tire curing press. FIG. 7 shows yet another embodiment of the present invention, which is similar to the previous embodiment. However, in the embodiment according to FIG. 7 a pre-molded film 12" is attached to the inner surface of a cured tire 11 (see particularly step 704). In particular, a mold 70 for pre-molding a film 12 is provided, wherein the mold 70 is used to pre-mold only the film 12 into a shape, e.g., a three-dimensional shape which is adapted to cover the inner surface of cured tire 11. Thus, in a first step 700 the mold 70 is provided. Then, the tubular film 12 is inserted into the mold 70, as schematically and simplified shown in step 701. The mold 70 is fully assembled and/or closed so as to mold the film into the desired tire cavity shape.

Mounting/insertion and/or molding preferably takes place at the same temperatures as mentioned herein above in relation to the embodiment of FIG. 6. In step 702, the mold 70 is partially open and shows the inner side of the molded film 12". In step 703, the mold 70 is completely removed, leaving the pre-molded film 12". This pre-molded film 12" is then inserted into the tire cavity of a cured tire 11 and attached to the inner surface of the tire 11 facing the tire cavity, as shown in step 704. Thus, tire 11" is obtained in step 705 which has an air barrier layer and/or film 12" at its inner surface facing its tire cavity. Optionally, the film is applied within 30 minutes after its pre-molding/molding to the cured tire 11 and/or is pre-heated before the insertion into the tire in step 704, preferably having a temperature as mentioned above. Optionally, also the tire is preheated to the same or similar temperature. As another option, an adhesive is applied to the inner surface of the tire 11 and/or the radially outer surface of the pre-molded film 12" before inserting and attaching the pre-molded film 12" to the inner surface of the tire 11.

The present invention helps to provide advanced airtight tires and/or tires with an air barrier layer, particularly with an air barrier layer which is easy to integrate into existing tire building processes. Furthermore, the air barrier layer is devoid of splices which avoids imbalances and potential leaks. Provision of the film and/or tire at elevated temperature helps to provide a film with reduced anisotropies. Butyl rubber, such as in a typical innerliner can be omitted. The tubular film does not need to be provided at the tire building machine and frees up capacity at the tire building machine. As the tires do not need a conventional innerliner, curing cycle times can be reduced, particularly if the film is provided to a cured tire. In particular, the film does not need to be applied at a tire building drum which can typically exert only a quite limited pressure to expand a film into a tire cavity. Types of tires which could be built with such a method would be limited. Furthermore, such methods (not in accordance with the present invention) may require further adaptations to the tire building process at the building drum and/or the equipment used at its position.

It is preferred that the film be an EVOh film. It is additionally preferred that the film has the following properties:

| Properties | Air-barrier film |
| --- | --- |
| Lowest operating temp. | 10 min @ −40 C. under cyclic stress |
| Highest Operating Temp | 20 min @ 180 C., 80 C. continuous operation under cyclic stress |
| Thickness | 10 to 30 mil |
| Air permeability | <=50 cc/(m^2-day) at the final film thickness |
| Moisture permeability | moisture resistant without loss of performance |
| Elongation at break | >200% |
| Cyclic fatigue, low frequency | 20 Hz, 10% tension compression, 50 MM cycles |
| Cyclic Fatigue, high frequency | 250 Hz, short duration, e.g. potholes etc. |
| Adhesion to plycoat in cured tire Modulus, low strain <100 Mpa | >=5 N/mm peel |

Features of the above aspects and embodiments thereof may be combined with one another.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of providing an air barrier layer to a tire comprising at least the steps of:
   providing a tire comprising a tire cavity and an inner surface facing the tire cavity, wherein the tire is devoid of an innerliner comprising butyl rubber;
   providing a tubular film with at least one open end;
   molding at least a portion of the tubular film to form an air barrier layer adapted to the inner surface of the tire;
   inserting the tubular film at least partially into the tire cavity; and
   expanding the tubular film in the tire cavity to form the air barrier layer adapted to the inner surface of the tire, wherein the tubular film is expanded by a pressurized fluid fed into the tubular film, and wherein the at least one open end of the tubular film is sealed by sealing plates and the fluid is provided through an inlet in one sealing plate into the tubular film inside the tire cavity to expand the tubular film in the tire cavity to form the air barrier layer adapted to the inner surface of the tire.

2. The method according to claim 1, wherein the at least one open end of the film is shortened after expanding the tubular film in the tire cavity to form the air barrier layer adapted to the inner surface of the tire.

3. The method according to claim 1, wherein the sealing plates are removed after forming the air barrier layer adapted to the inner surface of the tire.

4. The method according to claim 1, wherein the step of providing the tire provides a cured tire, so that the tubular film is expanded in the tire cavity of the cured tire to form the air barrier layer adapted to the inner surface of the cured tire.

5. The method according to claim 1, wherein the tubular film is inserted into the tire cavity along an axial direction of the tire.

6. The method according to claim 1, wherein the step of devoid of the innerliner comprising butyl rubber provides an uncured tire, and wherein the uncured tire is cured upon forming the air barrier layer adapted to and on the inner surface of the tire, so as to obtain a cured tire with the air barrier layer on the inner surface of the cured tire.

7. The method according to claim 1, wherein the tubular film comprises at least two layers, wherein a tubular inner layer of the layers comprises one or more of a thermoplastic polymer and a thermoplastic resin, and a tubular outer layer of the layers comprises an elastomer composition, wherein the tubular outer layer faces the inner surface of the tire.

8. The method according to claim 1, wherein the tire is one or more of:
   a pneumatic tire;
   a radial tire;
   a tire comprising a tread, a carcass, two bead portions and two sidewalls extending between the tread and the respective bead portion;
   a tire comprising a circumferential bead portion on each lateral side of the tire which defines a circular opening to the tire cavity;
   devoid of the innerliner comprising butyl rubber; and
   devoid of butyl rubber.

9. The method according to claim 1, wherein the tubular film is one or more of:
   devoid of a splice;
   comprising one or more of a thermoplastic polymer and a thermoplastic resin;
   provided from a coil carrying the tubular film;
   essentially rotation-symmetric;
   a film having an air permeability lower than 50 cm³/(m²·day);
   a film having a thickness within a range of 0.1 mm to 1.5 mm;
   a film having an elongation at break of at least 200%; and
   a film having an elastic modulus below 100 MPa.

10. The method according to claim 1, wherein the step of providing
   the tire provides a cured tire, and wherein the method further comprises at least one step of:
   providing one or more of the tubular film and the inner surface of the tire with an adhesive to bond the tubular film to the inner surface of the cured tire; and blow molding the tubular film to form the air barrier layer adapted to the inner surface of the tire at a post cure inflation stage.

11. The method according to claim 1, wherein the step of providing the tire provides an uncured tire, and the method comprises the further step of curing the tire within a temperature range from 110° C. to a temperature which is i) at least 1° C. below the melting point of the film, and ii) at most 190°, so as to co-cure the film to the inner surface of the tire.

\* \* \* \* \*